US011507945B2

(12) United States Patent
Talmor et al.

(10) Patent No.: US 11,507,945 B2
(45) Date of Patent: Nov. 22, 2022

(54) METHOD AND SYSTEM FOR USAGE OF CRYPTOCURRENCY, PREVENTING FINANCIAL CRIME

(71) Applicants: Eli Trakhovsky Talmor, Haifa (IL); Rita Trakhovsky Talmor, Haifa (IL)

(72) Inventors: Eli Trakhovsky Talmor, Haifa (IL); Rita Trakhovsky Talmor, Haifa (IL)

( * ) Notice: Subject to any disclaimer, the term of this patent is extended or adjusted under 35 U.S.C. 154(b) by 344 days.

(21) Appl. No.: 16/866,571

(22) Filed: May 5, 2020

(65) Prior Publication Data
US 2020/0364699 A1 Nov. 19, 2020

Related U.S. Application Data

(60) Provisional application No. 62/849,221, filed on May 17, 2019.

(51) Int. Cl.
| | |
|---|---|
| *G06Q 20/36* | (2012.01) |
| *G06Q 10/10* | (2012.01) |
| *G06Q 20/40* | (2012.01) |
| *G06F 16/23* | (2019.01) |
| *H04L 9/06* | (2006.01) |
| *G06Q 50/26* | (2012.01) |
| *H04L 9/00* | (2022.01) |

(52) U.S. Cl.
CPC ..... *G06Q 20/3674* (2013.01); *G06F 16/2379* (2019.01); *G06Q 10/10* (2013.01); *G06Q 20/3678* (2013.01); *G06Q 20/4014* (2013.01); *G06Q 50/265* (2013.01); *H04L 9/0637* (2013.01); *G06Q 2220/00* (2013.01); *H04L 9/50* (2022.05); *H04L 2209/56* (2013.01)

(58) Field of Classification Search
None
See application file for complete search history.

(56) References Cited

U.S. PATENT DOCUMENTS

| 10,600,009 | B1 * | 3/2020 | Augustine | G06F 16/9536 |
|---|---|---|---|---|
| 10,805,085 | B1 * | 10/2020 | Liang | H04L 9/3247 |
| 11,276,014 | B2 * | 3/2022 | Augustine | G06F 16/27 |
| 2018/0019993 | A1 * | 1/2018 | Kravitz | H04L 9/3236 |

(Continued)

*Primary Examiner* — Kaveh Abrishamkar

(57) ABSTRACT

The usage of money has been always abused for financial crime. The invention of cryptocurrency on Blockchain did not change that since the ownership essentially remained anonymous. The present invention deals with the programmatic parameterization of cryptocurrency Smart Contracts to include the binding between the user's cryptocurrency transaction and user's Identity, thus creating "permissioned" crypto-token transfer. Such binding has advantageous properties as being resilient to any form of financial crime, preventing cryptocurrency theft, and precluding "bad actors" from using this cryptocurrency. The system for Identity-Bound Cryptocurrency Transfer (IBCT) will include IBCT Blockchain Smart Contract, IBCT Blockchain Oracle Smart Contract, and off-chain Identification-as-a-Service for the IBCT owner using dedicated CryptoWallet for executing IBCT Smart Contract. The Financial crime-preventive usage of cryptocurrency is achieved through user-opted, while pseudonymous, binding of the user's Blockchain public address with the user's identity. This Financial crime-preventive usage of cryptocurrency is facilitated via a specialized crypto wallet.

20 Claims, 5 Drawing Sheets

(56) References Cited

U.S. PATENT DOCUMENTS

| | | | |
|---|---|---|---|
| 2020/0364699 A1* | 11/2020 | Talmor | H04L 63/123 |
| 2021/0044976 A1* | 2/2021 | Avetisov | H04L 9/321 |
| 2021/0065070 A1* | 3/2021 | Augustine | G06F 16/1837 |
| 2021/0304200 A1* | 9/2021 | Doney | H04L 9/30 |
| 2022/0138640 A1* | 5/2022 | Augustine | G06Q 30/0215 |
| | | | 705/5 |

* cited by examiner

METHOD AND SYSTEM FOR USAGE OF CRYPTOCURRENCY, PREVENTING FINANCIAL CRIME

CROSS-REFERENCE TO RELATED APPLICATIONS

The following invention claims the benefits of provisional US patent application Ser. No. 62/849,221

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A READ_ONLY OPTICAL DISC OR AS TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

(1) Technical Field

The present invention is in the field of Information Technology (IT) Security. More specifically it refers to the design and usage of crypto-currency, resilient to financial crime, secure from theft, and inapplicable for money laundering. Cryptocurrency is transferred on Blockchain from one public address to another. Each public address may hold multiple cryptocurrencies. Each user may hold multiple public addresses via the usage of different crypto wallets. The financial crime-preventive usage of cryptocurrency is achieved through user-opted, while pseudonymous, binding of the user's Blockchain public address with the user's identity. This financial crime-preventive usage of cryptocurrency is facilitated via a specialized crypto wallet.

(2) Background Art

Money has existed for thousands of years, practically—unchanged. It has been anonymous since the dawn of human civilization until the present day. Both parties of the money transaction simply trust the currency created by the Trusted Third Party, such as today's Central Bank. But the existence of crime makes this simple feature of mutual trust—quite problematic. We invest a huge amount of our money into the infrastructure to protect it from being stolen. But stolen money is not the only effect of the crime. After being stolen—the money is laundered, to fuel and finance more crime. So this crime wheel is spinning forever. Blockchain technology has been used to generate thousands of cryptocurrencies and tokens, which mimic the fiat currencies in the digital domain and leave the problem of crime unsolved.

Blockchain technology is simple to understand at its roots. This technology tech exists as a shared database filled with entries that must be confirmed and encrypted. It's helpful to envision it as a strongly encrypted and verified shared Google Document, in which each entry in the sheet depends on a logical relationship to all its predecessors. Blockchain provides a way to securely and efficiently create a tamper-proof log of sensitive activity. A Blockchain is a distributed ledger technology that preserves a continuous chain of records called blocks. Each block is time-stamped and linked to previous blocks, using cryptography to verify all records. Thus Blockchain represents a secure-by-design ledger. Unlike traditional approaches, Blockchain eliminates the need for centralized control—instead, all transactions are decentralized and verified by the Blockchain database itself in the distributed ledger. Contrary to the most popular use case (cryptocurrency), Blockchain technologies don't only secure financial transactions. They can be used to track and verify any kind of digital asset, as well as code or smart contracts. Blockchain use cases also include the sharing of medical records, processing IoT transactions, record-keeping for the public sector, and many others.

There are two kinds of Blockchain: Public with anonymous (more precisely—pseudonymous) records and Private "permissioned" Blockchains— where the identities of all members (limited to the small number of users) are known. Cryptocurrency such as Bitcoin uses Public Blockchain, preserving user's Privacy, while Enterprises use Private Blockchain, preserving the user's Identity. It appears that Private Blockchains are better suited for financial crime prevention than Public Blockchains.

"Permissioned" private Blockchains use PKI (Public Key Infrastructure) digital certificates to enable user's Identity into the Blockchain. It is well known that this approach cannot be scaled up to the Public Internet. Secure digital certificate provisioning can be performed only within Enterprises.

Today an online marketplace (or online e-commerce marketplace) is a type of e-commerce site where product or service information is provided by multiple third parties, whereas transactions are processed by the marketplace operator. Such a marketplace is essentially centralized, combining trading, legal, and escrow functionalities. But in the future online marketplace may be become decentralized, using so-called smart-contracts, where these functionalities are programmatically enforced. A smart contract is a computer protocol intended to digitally facilitate, verify, or enforce the negotiation or performance of a contract. Some networks, such as Etherium, allow complex Turing-complete contracts to run on its network. A Turing-complete programming language is one that allows you to create variables and constants, and perform increments and loops. With this enhanced functionality, a Smart Contract can communicate with services in the real world, using, the so-called, Oracle smart contracts.

The purpose of the present invention is to create secure-by-design usage of cryptocurrency, that cannot be stolen or used for money laundering, thus serving as the backbone of the future Programmable Economy.

The State-of-the-Art of Cryptocurrency.

Cryptocurrencies are generated using smart contracts run on Public or Private Blockchain. For example, widely popular EIP 20 standard cryptocurrencies are generated using Ref. 1:

The following parameters are available for Cryptocurrency creators:
name
Returns the name of the token—e.g. "MyToken".
OPTIONAL—This method can be used to improve usability, but interfaces and other contracts MUST NOT expect these values to be present.
function name( ) public view returns (string)
symbol
Returns the symbol of the token. e.g. "HIX".
OPTIONAL—This method can be used to improve usability, but interfaces and other contracts MUST NOT expect these values to be present.
function symbol( ) public view returns (string)
decimals
Returns the number of decimals the token uses—e.g. 8, means to divide the token amount by 100000000 to get its user representation.
OPTIONAL—This method can be used to improve usability, but interfaces and other contracts MUST NOT expect these values to be present.
function decimals( ) public view returns (uint8)
totalSupply
Returns the total token supply.
function totalSupply( ) public view returns (uint256)
balanceOf
Returns the account balance of another account with the address owner.
function balanceOf(address _owner) public view returns (uint256 balance)
transfer
Transfers _value amount of tokens to address _to, and MUST fire the Transfer event. The function SHOULD throw if the message caller's account balance does not have enough tokens to spend.
Note Transfers of 0 values MUST be treated as normal transfers and fire the Transfer event.
function transfer(address _to, uint256 _value) public returns (bool success)
transferFrom
Transfers _value amount of tokens from address _from to address _to, and MUST fire the Transfer event.
The transferFrom method is used for a withdraw workflow, allowing contracts to transfer tokens on your behalf. This can be used for example to allow a contract to transfer tokens on your behalf and/or to charge fees in sub-currencies. The function SHOULD throw unless the _from account has deliberately authorized the sender of the message via some mechanism.
Note Transfers of 0 values MUST be treated as normal transfers and fire the Transfer event.
function transferFrom(address _from, address _to, uint256 _value) public returns (bool success)
approve
Allows _spender to withdraw from your account multiple times, up to the _value amount. If this function is called again it overwrites the current allowance with _value.
NOTE: To prevent attack vectors, clients SHOULD make sure to create user interfaces in such a way that they set the allowance first to 0 before setting it to another value for the same spender. THOUGH The contract itself shouldn't enforce it, to allow backward compatibility with contracts deployed before function approve(address _spender, uint256 _value) public returns (bool success)
allowance
Returns the amount in which _spender is still allowed to withdraw from _owner.
function allowance(address _owner, address _spender) public view returns (uint256 remaining)
Events
Transfer
MUST trigger when tokens are transferred, including zero value transfers.
A token contract that creates new tokens SHOULD trigger a Transfer event with the _from address set to 0×0 when tokens are created.
event Transfer(address indexed _from, address indexed _to, uint256 _value)
Approval
MUST trigger on any successful call to approve (address _spender, uint256 _value).
event Approval(address indexed _owner, address indexed _spender, uint256 _value)
Summarizing: Transferfrom Transfers _value amount of tokens from address _from to address _to. So the usage of cryptocurrency is quite similar to the fiat money. All you need to specify where the cryptocurrency comes from and where it goes. It appears that none of the above parameters and events involves binding with sender and/or recipient Identities.
Implementation
There are already plenty of ERC20-compliant tokens deployed on the Etherium network. Different implementations have been written by various teams that have different trade-offs: from gas saving to improved security. Example implementations are available at Refs. 2 and 3.
Can You Amend an ERC20 Token/Smart Contract Once Deployed?
Because of the immutable nature of the blockchain, once you execute a contract the code is there forever. However, bugs happen and code needs to be updated and the Etherium developers found a way around this. In the contract code, there is an opcode called DELEGATECALL that can forward contract requests to the 'latest' version of the code. In this way, you can re-upload code and have a variable that forwards calls to the latest code. HOWEVER, your original code needs to allow for this 'up-gradable' feature or you can't forward calls. So long as you include the ability to forward contracts to new locations, you'll be able to upgrade them.
Deficiencies of the State-of-the-Art of Cryptocurrency:
The cryptocurrency can be stolen, using myriad different ways. Therefore hugely expensive infrastructure needs to be built around its usage—very much familiar with the financial infrastructure of fiat currency. Cryptocurrency exchanges are based upon anonymous, peer-to-peer transactions. There is no Trusted Third Party/Regulator to complain: your loss is your loss. Regulators are scared by Crypto Currency anonymity (playground for Bad Actors, doing money laundering). They would rather prefer to prevent Bad Actors to use it. There is also no solution for a double-spend problem, where two cryptocurrency transactions are originated from the account nearly at the same time, capitalizing on low Blockchain latency and defrauding e-merchants, receiving these transactions. There is no solution for a 51% attack—the ability of someone controlling a majority of Blockchain network Nodes to revise transaction history and prevent new transactions from confirming. The lack of trust has an impact on performance in permission-less Blockchain—the Nodes are operating under a slow consensus mechanism, resulting in low transaction rates.
The reference is being made for:
The usage of Cloud-based Identification-as-a-Service (IDaaS) in potential malware environment as described in our U.S. patent Ser. No. 10/425,407. The usage of smartphones for Identity verification as described our U.S. patent application Ser. No. 15/774,012. TRIO (software-hardware-cloud) crypto wallet as described in our U.S. patent application Ser. No. 16/233,217. The latter patent application describes the solution to the vulnerability of private keys in Blockchain applications.

BRIEF SUMMARY OF THE INVENTION

Technical Problems

There are many Public Blockchains: Bitcoin, EOS, Tron, Etherium, BitShares, Nebulas, Ontology, NEO, Ripple, and many others. Therefore smart contracts can be deployed on many of them, producing Cryptocurrency Tokens, serving other smart contracts running on these decentralized Blockchains. Alternatively, smart contracts can be deployed on private Blockchain, such smart contracts producing Cryptocurrency Coins, serving other smart contracts running on that Blockchain, regulated for example by Central Bank. The present invention addresses the usage of new cryptocurrencies. In yet another alternative—existing cryptocurrency usage can be modified to address the aforementioned deficiencies.

It is therefore highly advantageous to address the deficiencies of the current state-of-the-art of cryptocurrency through solving these technical problems:
- Introducing built-in security via Identity into a cryptocurrency usage,
- Enabling Regulation for Anti Money Laundering (AML) and Anti Terrorist Financing (ATF),
- Defining highly-reliable Validated Transaction,
- Thus improving Blockchain transaction rate and security.

Fiat money supports anonymous usage (cash) as well as onymous (identifiable) usage (through the financial system). Similarly, the present invention will support both the anonymous and identifiable usage, through different wallets.

The Solution to the Problems

Since cryptocurrency is defined by its smart contract—one must modify it to reach these goals. The modification approach here is changing the "anonymous money" into "onymous money", creating the first IBCT—Identity Bound Cryptocurrency Transfer. Since Identity binding is computer session-dependent—it must also include transaction Session ID as the Session Identifier. The transaction Session ID can be loaded into the Blockchain transaction using the so-called Hex Data field.

The difference between cash, existing cryptocurrencies, and IBCT is shown below:

| Money types | Externally (Privacy) | Internally (underlying Technology) |
|---|---|---|
| Money (Cash) | anonymous | anonymous |
| Cryptocurrency | pseudonymous | anonymous |
| IBCT | pseudonymous | onymous |

The underlying technology of money (cash) and its external use (by the public) is anonymous.

The underlying technology of existing cryptocurrency is anonymous (Public Key is anonymous) although external use by the public can be traced down making it pseudonymous.

The underlying technology of IBCT is Identity-based (onymous), while its external use is pseudonymous like other cryptocurrencies.

Advantageous Effects of the Invention

The success of IBCT may have a huge impact on modern society. The usage of Money/Cryptocurrency today powers financial crime, including bribery and corruption; money laundering; fraud; theft; cybercrime; and slave labor/human trafficking. Ref. 4 provides a global estimate of lost turnover as a consequence of financial crime at 3.5%, giving a global estimated loss of turnover of just over $1.45 trillion. While cryptocurrencies are still in a nascent stage—the present Market Cap is $185 billion as shown in Ref. 5. The financial crime has already "adopted" it: $1.7 billion in cryptocurrency was stolen and scammed in 2018 (see Ref. 6, 7). Therefore the usage of IBCT should have a dramatic impact on the prevention of financial crime.

A system and method for the Financial Crime-preventive Usage of Cryptocurrency are described. In the following description, for an explanation, numerous specific details are outlined to provide a thorough understanding of the present invention. It is apparent, however, to one skilled in the art that the present invention may be practiced without these specific details or with an equivalent arrangement. In other instances, well-known structures and devices are shown in block diagram form to avoid unnecessarily obscuring the present invention.

BRIEF DESCRIPTION OF THE SEVERAL VIEWS OF THE DRAWINGS

Various exemplary embodiments are illustrated by way of example, and not by way of limitation, in the figures of the accompanying drawings in which like reference numerals refer to similar elements and in which we describe.

DETAILED DESCRIPTION OF THE INVENTION

Figure 1:
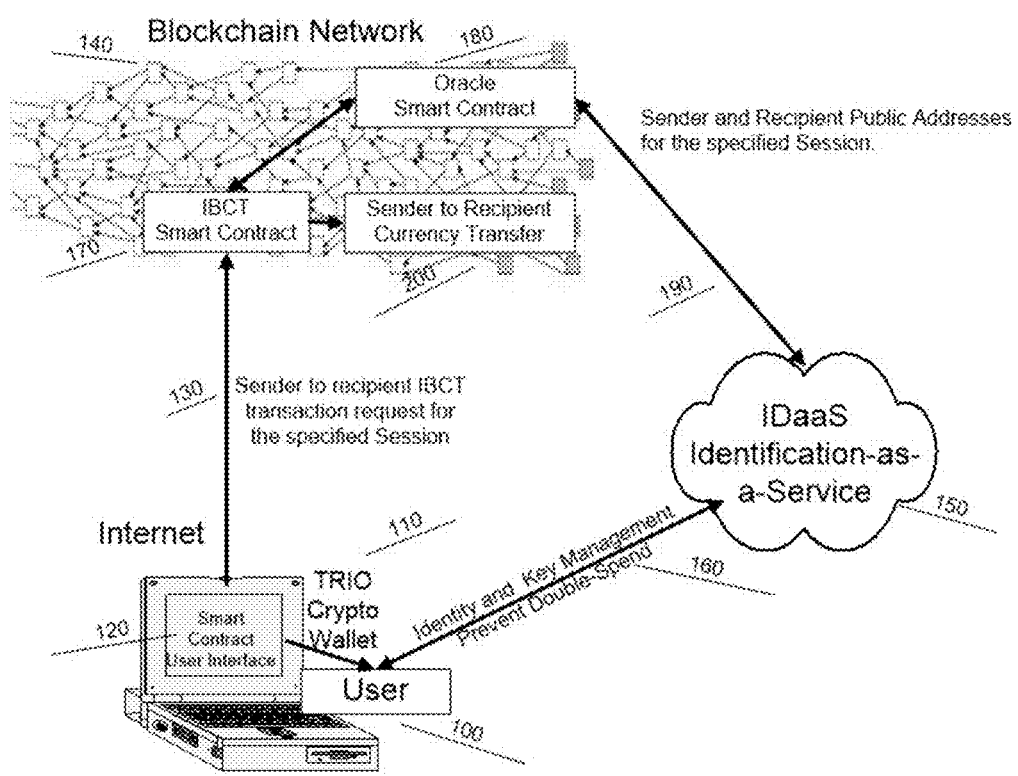
FIG. 1: Identity-Bound Cryptocurrency Transfer Architecture.

Referring to FIG. 1: User 100 is using TRIO Crypto Wallet 110 to transfer IBCT cryptocurrency from his Public Address to Recipient Public Address. TRIO crypto wallet uses software-based, Browser User Interface 120 to interact with IBCT smart contract 170 on Blockchain Network 140. The latter can be Private or Public. The interaction 120 results in transaction request 130; this transaction request to be identified by Session Identifier (large integer). The latter can be loaded into the Blockchain transaction using the so-called Hex Data field. TRIO Crypto Wallet 110 requires that user 100 to be identified 160 in real-time using his/her hardware—smartphone- vs Cloud-based IDaaS Identification-as-a-Service 150. The Strong Identification 160 results in Identity Key provisioning of TRIO 110 by IDaaS 150 (as described in Ref. 10), IDaaS also checks the timestamps of the current and previous sessions for the same user's public address to prevent double-spending 160. The latter is checked vs. Blockchain Network Transaction Latency for double-spending detection. If no double spending is detected—the Identity Key Provisioning 160 is used to calculate TRIO private key which is used to sign the transaction request 130. IBCT smart contract 170 calls Oracle Smart Contract 180. The latter uses an API call 190 off-blockchain to IDaaS 150. An API call uses a Session ID (in Hex Data format) as a parameter to query IDaaS 150 about the unconfirmed (yet) transaction 130. The query 190 results in the validated sender and recipient public addresses. Oracle 180 forwards this information to IBCT smart contract 170. If above security requirements are satisfied—Sender to Recipient Currency Transfer is recorded on Blockchain Network 200.

Figure 2:
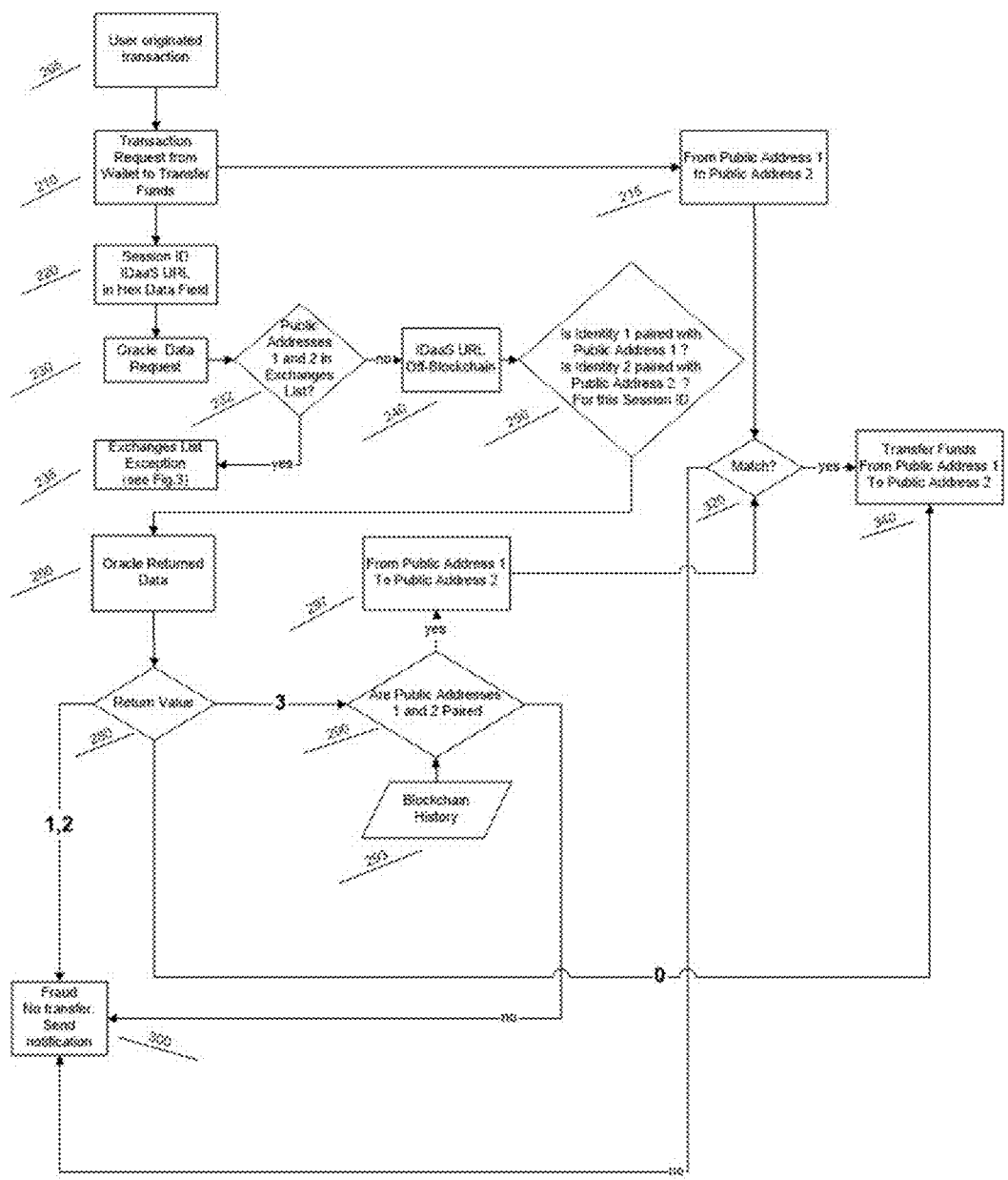
FIG. 2: Smart Contract Transaction Flowchart.

Referring to FIG. 2: Execution of IBCT Smart Contract on Blockchain is triggered by the user at 205, using Wallet to Transfer Funds 210. To this end, the Public Address of Sender and Recipient are Specified 215. Also: Wallet sends Session ID and IDaaS Domain URL 220 loaded into the Blockchain transaction using the so-called Hex Data field, uniquely identifying the transaction request. Thus, multiple IDaaS can provide similar services to different users. Smart Contract 205 is calling Blockchain Oracle Smart Contract 230. The latter queries whether Sender 1 or Recipient 2 Public Addresses are on Currency Exchanges List 232. If the answer is yes 235—see FIG. 3. If the answer is no—the Oracle calls off-chain Identification-as-a-Service, corresponding to IDaaS Domain URL, 240 using the said Session ID. IDaaS queries its database 250 for transaction identified with said Session ID 220. Oracle returns data 260. There are 4 possible results 280. If the result is 0 (the sender is anonymous)—the transfer is authorized 340. If the result is 1 or 2—then fraud is detected (false session or false recipient) and no transaction is authorized, with proper notification. If the result is 3, then an additional check is performed 290 over Blockchain History 293 to check whether sender address 1 and recipient address 2 previously exists 297 (with Hex Data Field in format 220). The negative result of 290 means the fraud is detected 300, due to possible attack on IDaaS. The positive result of 290 means that True Identity 1 of the sender is paired with public address 1 and True Identity 2 of the recipient is paired with public address 2. If the results 297 and 215 are matched 320 then transfer 340 is recorded on Blockchain by IBCT smart contract. This transaction is recorded in Blockchain History (with Hex Data Field in format 220) for future query 290. Else—the fraud is detected 300.

Referring again to FIG. 2: not every Public account on the Blockchain will be necessarily bound to IDaaS 280. So there are 4 possible outcomes of the Oracle query regarding Public Address 1 (the sender) and Public Address 2 (the recipient):

Return Rules for Oracle:
If public address 1 is not paired with Identity at IDaaS>>>Return=0
Return=0 corresponds to the user's use of cryptocurrency in anonymous mode,
If session ID does not exists at IDaaS>>>Return=1
If public addresses 1 is not paired with Identity at IDaaS>>>Return=2
Return=1, 2 means that this session is fraudulent
If all match at IDaaS>>>Return=3
Referring again to FIG. 2:
Return=3 corresponds to Validated Transaction. This particular transaction has been validated, according to the present invention, and its validity is independent of the Blockchain Nodes consensus mechanism. How secure these Validated Transactions are?

The security of cryptocurrency transfer includes three interconnected parts:
1. TRIO Security and Privacy (as described in U.S. patent application Ser. No. 16/233,217),
2. IDaaS Real-Time Identification (as described in U.S. patent application Ser. No. 15/774,012 and U.S. patent Ser. No. 10/425,407),
3. IBCT Smart Contract Security (as described in the present invention).

Thus validating that:
1. The user (sender) originated the transaction,
2. The recipient address is indeed the intention of the sender,
3. The sender is not abusing the system (double-spend is prevented).

Security of TRIO and IDaaS were previously discussed in Referenced application 8, 9, 10. IBCT security is to be discussed here.

Referring again to FIG. 2: How secure IBCT Smart Contract execution is?

Based upon the immutability of Blockchain—once written—it cannot be forged. Its execution is hard-coded and bound to Oracle smart contract that cannot be forged as well. The out-of-blockchain API call over https is hard-coded by the Oracle smart contract owner. The parameter used for Oracle request is Session ID, a large integer ensuring its uniqueness. The real-time response from IDaaS, for this session ID, contains both sender and recipient addresses. The probability that attacker manipulates Oracle-to-IDaaS is very low.

There are two possible attack planes:
Executing fraudulent request without the user's knowledge, following the steps:
1. Identity Key, sent by IDaaS in real-time (see Ref.10), may be compromised by an attacker—still the attacker needs to steal the user's wallet key as well, to be able to hack the user's private key, generated in memory for fraction of second. Thus the probability of stealing the private key, generated in real-time, is very low. But in the future, this may be possible via a brute-force attack on private keys using quantum computing.
2. Even if step 1 is successful—the attacker must forge the event of actual identification, since only this event may trigger the valid API response to Oracle request.
3. Even if steps 1 and 2 are successful—to trigger the IBCT Smart Contract execution, necessary to authorize a fraudulent transaction, the software-crafted Session ID must be launched using the TRIO wallet. The probability of interception of the Session ID, generated in real-time, is very low. Therefore an attacker will also need to modify the TRIO wallet software to prevent it from launching real-time strong identification.

Forging User's Real-Time Transaction Request:
An attacker must be able to modify the transaction recipient address in real-time both at the user's browser and IDaaS server. The simultaneous probability of both—is very low.

Concluding: stringent security-in-depth implies that overall chances to steal Identity-bound cryptocurrency transfer are very low, many orders of magnitude lower than the current state-of-the-art.

Referring again to FIG. 2: But what will happen if (how unlikely it may be) any of these attacks will succeed?

Since the recipient address belongs to the attacker known to IDaaS and the victim will complain about the theft to law-enforcement officials—then the attacker may be arrested and will be forced to return the funds to the victim.

But what if the attacker recipient's address is unknown to IDaaS? This is the worst-case scenario, but to succeed, in this single transaction theft, the attacker must, simultaneously: impersonate Address 1, manipulate Address 2, intercept Private Key and Session ID, and impersonate Oracle to IDaaS communication—all that at enormous cost! Thus the probability of Blockchain Node writing fraudulent transaction with return=3 is negligible.

The question remains: can this unlikely scenario be removed programmatically? Does this condition can be enforced by the blockchain itself and thus being independent on IDaaS, achieving full decentralization? The answer is yes, using the following rules 290:
1. Recipient's Public Address A2 is bound to Identity if in-Blockchain history exists previous transfer to A2 terminated with result=3.
2. Sender Public Address A1 is bound to Identity if in Blockchain history exists previous transfer from A1 terminated with result=3.

These conditions are independent of IDaaS. Therefore the known vulnerability of Centralized Oracles (attack on IDaaS-Oracle communication interface) is removed. This is the reason for adding condition 290 at FIG. 2

Referring again to FIG. 2: regarding Exchanges list exception 235.

We need to resolve the problems of Onboarding of Public Address (not paired with Identity yet), accompanied by the purchase of cryptocurrency from Exchange (not paired with Identity, by default) and Exit of Public Address via the selling of cryptocurrency to Exchanges (not paired with Identity, by default).

Figure 3:
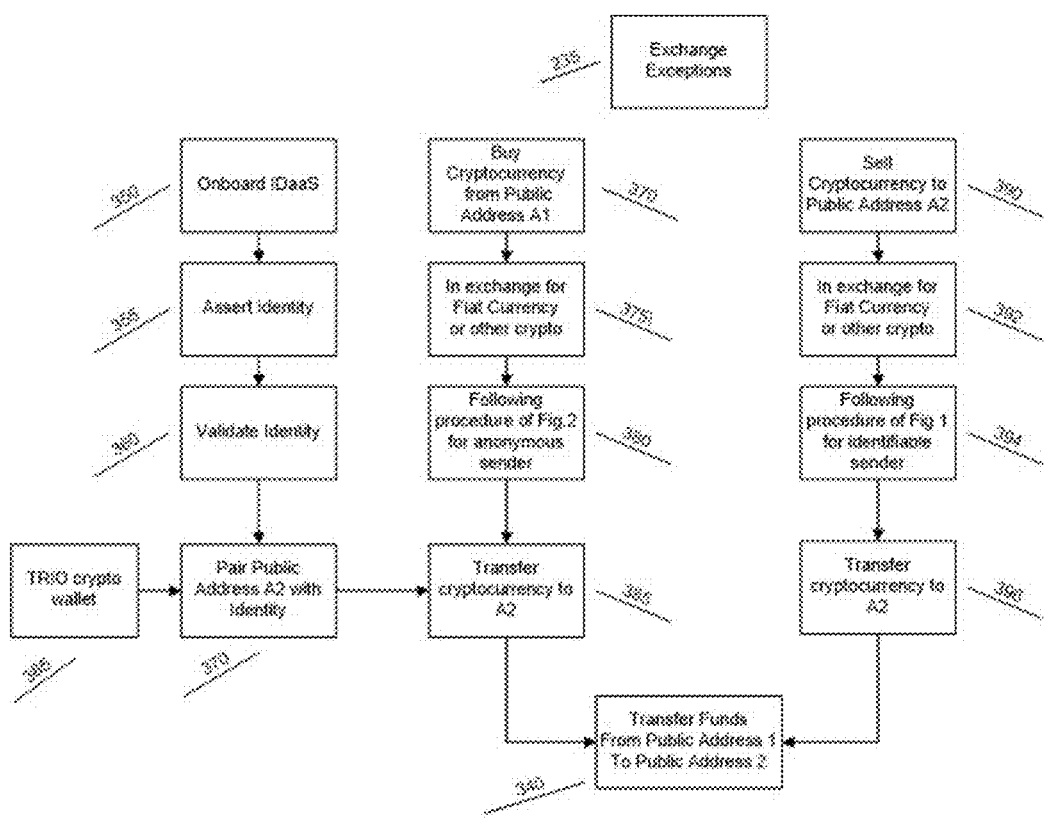
FIG. 3: Exceptions in Smart Contract Flowchart for Exchanges Transactions.

Referring to FIG. 3:

The following special condition will apply 235 (as shown previously in FIG. 2):

How do users buy into IBCT for the first time? This is done through IDaaS 350 and Exchanges 370.
1. First one must get on-board at IDaaS:
Step 1: the users must assert their Identity 355, for example using Facebook.
Step 2: the users must validate this assertion 360, for example using PayPal (see Refs 8,9).
How to pair the Identity with public address 370 using TRIO, 365— see Ref. 10.
2. Then one must transfer Fiat Currency or other cryptocurrencies to Exchange 375. In return, the corresponding amount of cryptocurrency 380 is transferred from A1=Exchange Address to the users A2 after it was paired with Identity 370. The transfer will follow the procedure of FIG. 2 for anonymous sender 380, but in this case, the recipient public address has to be paired with his/her Identity 370.

Another special condition is selling cryptocurrency from Address A1 (paired to Identity) to Address A2, which belongs to Exchange (390,392). The sender is following the procedure of FIG. 1, 394. The transfer is allowed 396 because the recipient belongs to the Exchanges list 235.

Both conditions of FIG. 3 can be enforced by licensing Exchanges to buy/sell Identity-Bound Cryptocurrency.

Figure 4:
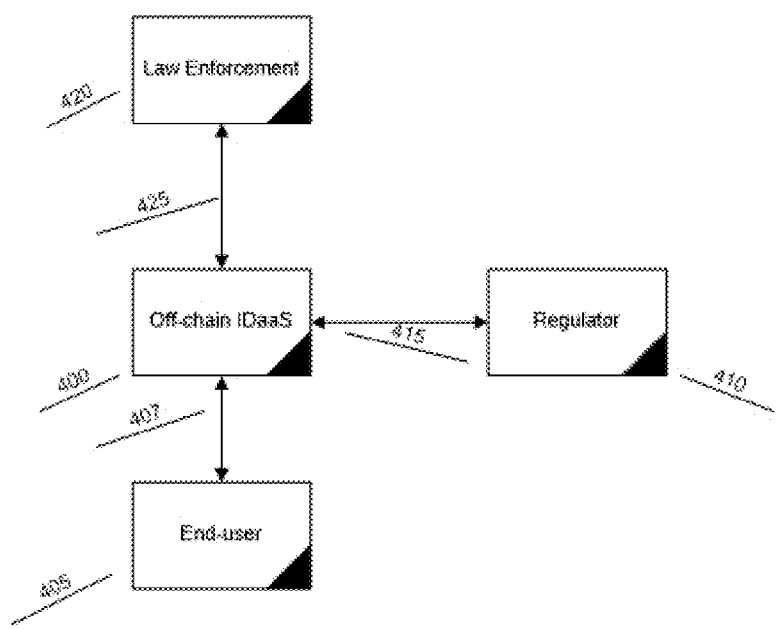
FIG. 4: Identity-Bound Cryptocurrency Transfer Audit.

Referring to FIG. 4: The records on Blockchain are shown through anonymous Public Addresses. The qualified services such as Law Enforcement 420 or Regulator 410 may query 425, 415 the Off-Chain Identification-as-a-Service 400 regarding True Identities, corresponding to Public Addresses. This ensures that sender and recipient True Identities can be exposed under audit or legal requests, thus preventing the use of IBCT for money laundering or other financial crimes End-users 405 may also contact 407 Off-chain IDaaS in case they made a transfer to the wrong recipient. In such a case, Off-chain IDaaS will contact the erroneous recipient requesting to execute a reverse transaction.

Figure 5:
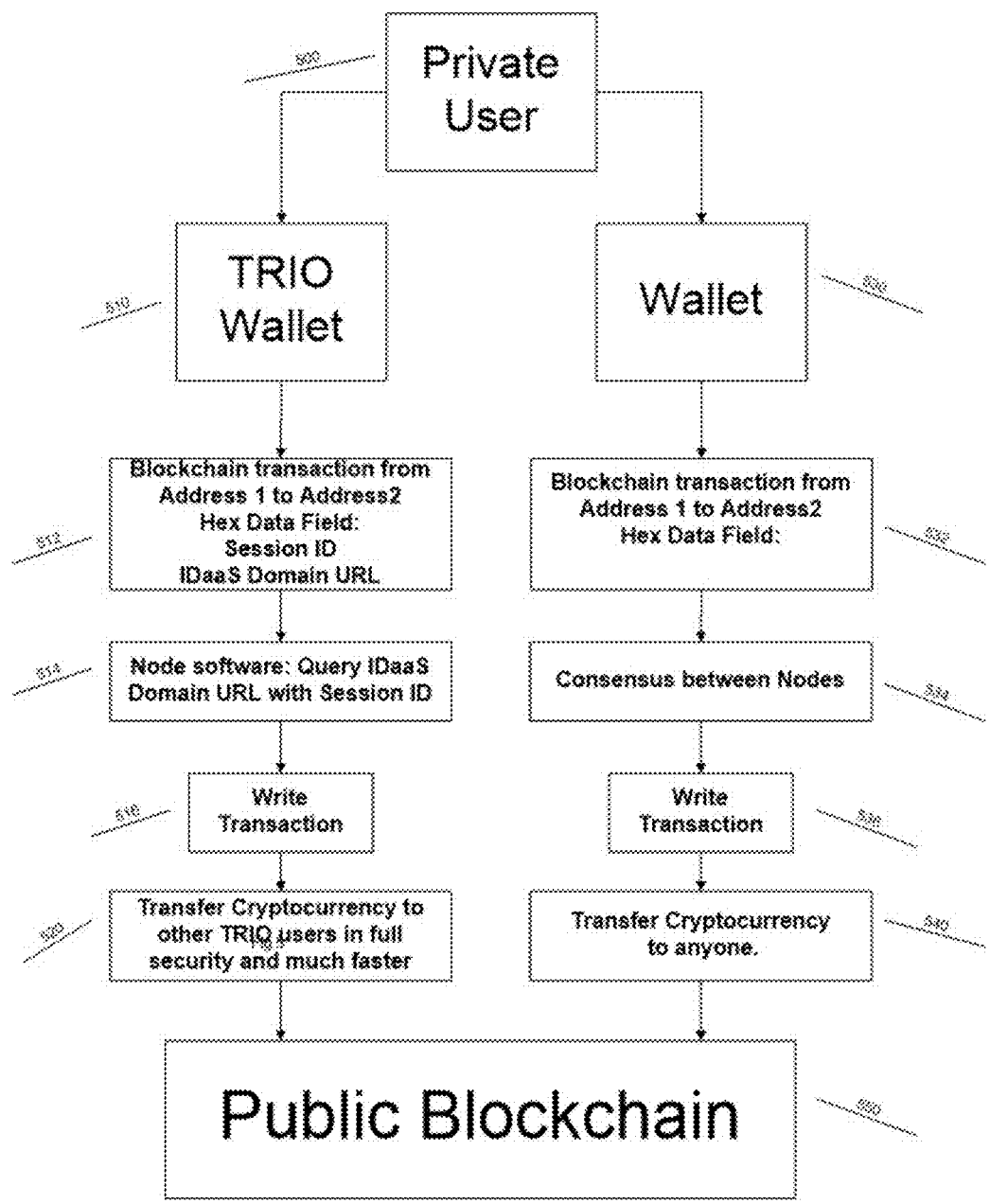
FIG. 5: Private User on Public Blockchain: available options.

Referring to FIG. 5: User 500 can use TRIO wallet 510, binding his public address to his Identity to transfer cryptocurrency to any other TRIO wallet. The resulting Validated Transaction contains the Hex data field with the Session ID and IDaaS domain URL 512. Node software queries IDaaS domain URL with Session ID 514. On success—it writes transaction 516. The resulting Blockchain transaction is fully secure and much faster than presently available 520. The same user 500 can use any other wallet 530 to execute Blockchain transaction. This Pooled transaction does not contain Hex Data Field with IDaaS authorization 532. Consensus between Nodes is used to write Pooled transaction 534. This allows transferring the same cryptocurrency to anyone 540. All that using Public Blockchain 550.

Referring again FIG. 5: Validated Transactions can be used to improve the Blockchain transaction rate as opposed to un-validated (pooled) transactions. As applied in existing state-of-the-art: un-validated transactions are not final and require a slow consensus mechanism.

Validated Transactions, according to the present invention, are to be trusted by design. They may be deemed final and they may be re-defined with elevated privileges. For example, as if they do not require consensus mechanism. Therefore the Blockchain Node protocol may be vastly improved if Validated Transaction with Hex Data Field, according to the present invention, will be written into Block immediately, without waiting for consensus mechanism. This may require updating Node software for elevated privileges of Validated Transactions. This improvement may be accomplished by modifying the Blockchain Consensus algorithm to provide the highest priority for Validated Transactions.

An additional improvement is resilience to the majority blockchain node takeover attack: majority or more than 50%, blockchain nodes where the vulnerability is the scenario in which the majority of the nodes attack the network. Let's say majority nodes collude together—may be controlled by the same entity, etc.—to then manipulate or corrupt the entire network to their advantage. The rest of the network, the minority, is forced to accept the corrupt or wrong version of the ledger simply because the technology protocol is built that way—in case of differences, to force prevail the majority version. Note the key here is that the majority, '51%' or more, to have an identical version of the ledger simultaneously—corrupted to their advantage or not—to then become the majority version in the network. Since IDaaS contains the ledger of approved and rejected transactions—the technology protocol of the consensus may be modified to repel the attack on the blockchain itself. For example, the blocks containing Validated Transactions cannot be rewritten by any Majority. This improvement may be accomplished, for example, by modifying the Blockchain Consensus algorithm to provide the highest priority for Validated Transactions. Thus Validated Transactions, according to this invention, may contribute to better Security and Throughput of Blockchain Network. Validated Transactions will look like any other transaction with exception of Hex Data field, certifying the Domain URL of the IDaaS and Session ID that was used to validate it.

Additional Advantageous Effects of the Invention

Summarizing IBCT smart contract will be executed if the sender address and recipient address are Identity-Bound as recorded on Blockchain or the sender/recipient belongs to licensed Exchanges as recorded on Blockchain.

Thus the trustless Blockchain rule will be established:

Once the public address is bound to Identity it can be used to receive cryptocurrency from a private user, whose public address is bound to his Identity or from licensed Exchanges.

If the public address is not bound to Identity, with the exception of licensed Exchanges,— it will not receive cryptocurrency from a private user, whose public address is bound to his Identity.

Dispute resolution mechanism can be used to reverse erroneous transactions if both sender and recipient addresses are bound to Identity.

If the public addresses are not bound to Identity (anonymous users)—they can send or receive cryptocurrency from one to another.

Does IDaaS introduce centralization (single-point-of-failure) into decentralized Blockchain? Indeed Identity-Bound Cryptocurrency Transfer is a closed-loop system, namely one can not send it outside to (anonymous) address 2. But the same user can use a different account using a different wallet, with the same cryptocurrency—but anonymously. Thus he can transfer this cryptocurrency to anyone. Therefore—there is no single point of failure and centralization is avoided. This similar to Fiat Money: we can use Banks for Online Transactions, but we do not need them for Cash transactions.

In general we consider IDaaS to be trusted and secured such that the hardware and software it uses are tamper-proof to a reasonable certainty and it functions securely.

By adding Trusted IDaaS to Trustless Blockchain—Financial Crime-preventive Cryptocurrency usage is achieved.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed

CITATION LIST

Non-Patent Literature

1. EIP 20 standard of crypto-currencies: https://github.com/ethereum/EIPs/blob/master/EIPS/eip-20.md
2. Consensus Crypto Currency contracts: https://github.com/ConsenSys/Tokens
3. Open Zeppelin Crypto Currency contracts: https://github.com/OpenZeppelin/openzeppelin-solidity/tree/master/contracts/token
4. True Cost of Financial Crime in Europe: https://www.refinitiv.com/content/dam/marketing/en_us/documents/reports/true-cost-of-financial-crime-europe-focus.pdf
5. Cryptocurrency Market Cup: https://coinmarketcap.com/charts/6.Stolen Cryptocurrency: https://www.helpnetsecurity.com/2019/01/30/stolen-cryptocurrency/7.Crime with Cryptocurrency: https://www.cnbc.com/2019/01/29/crime-still-plague-cryptocurrencies-as-1point7-billion-was-stolen-last-year-.html Patent Literature 8. U.S. patent application Ser. No. 15/774,012 "Method and system for protecting and utilizing Internet Identity using smartphone"
9. U.S. patent Ser. No. 10/425,407 "Secure Transaction and Access using insecure device"
10. U.S. patent application Ser. No. 16/233,217 "Method and System for secure Applications using Blockchain."

CLAIMS commencing on a separate sheet

ABSTRACT OF THE DISCLOSURE commencing on a separate sheet

SEQUENCE LISTING

Not Applicable

What is claimed is:

1. A method for preventing cryptocurrency theft and money laundering, comprising:
running a public blockchain network, including a smart contract for cryptocurrency creation and operation, such smart contract including various pre-defined transaction functions, and a plurality of users, each having a different public account address;
establishing the identity of some of the said users, while the rest of the users remain anonymous;
executing said smart contract transaction functions, wherein public account addresses of cryptocurrency sender and recipient are parameters of these functions;
excluding said execution of said smart contract transaction functions for anonymous cryptocurrency recipient.

2. The method claim 1 wherein the blockchain network is based upon Ethereum technology and smart contract is based upon ERC-20 standard.

3. The method of claim 2 wherein smart contract transaction functions with said exclusion are transfer and transferFrom.

4. The method of claim 1 wherein said user identity is bound to said user's public account address using identification-as-a-service integrated with said user's cryptocurrency wallet.

5. The method of claim 1 wherein cryptocurrency recipient identity is determined to be known to cryptocurrency smart contract if there were successful transfers of said cryptocurrency to the said recipient in the past so that cryptocurrency balance of recipient public address is positive at the time of said determination.

6. The method of claim 1 wherein cryptocurrency recipient identity is determined to be known to cryptocurrency smart contract, using the call of the smart contract for cryptocurrency to oracle smart contract on the same Blockchain, utilizing off-chain identification-as-a-service.

7. The method of claim 5 wherein the first transfer of cryptocurrency from a pre-determined public account address is accomplished in conjunction with user onboarding.

8. The method of claim 3, wherein cryptocurrency transfers may be reversed, resulting in recipient balance decreased and sender balance equally increased.

9. The method of claim 4 wherein blockchain network nodes software queries identification-as-a-service for the timestamp of the pending blockchain transaction.

10. The method of claim 9 wherein blockchain nodes order transactions in blocks according to their timestamp, thus preventing attacks on blockchain integrity and improving consensus algorithms.

11. A system for preventing cryptocurrency theft and money laundering, comprising:
- a public blockchain network, including a smart contract for cryptocurrency creation and operation, such smart contract including various pre-defined transaction functions, and a plurality of users, each having a different public account address;
- an identification process, establishing the identity of some of the said users, while the rest of the users remain anonymous;
- an execution process of said smart contract transaction functions, wherein public account addresses of cryptocurrency sender and recipient are parameters of these functions;
- an exclusion process of said execution of said smart contract transaction functions for anonymous cryptocurrency recipients.

12. The system of claim 11 wherein the blockchain network is based upon Ethereum technology and smart contract is based upon ERC-20 standard.

13. The system of claim 12 wherein smart contract transaction functions with said exclusion are transfer and transferFrom.

14. The system of claim 11 wherein said user identity is bound to said user's public account address using identification-as-a-service integrated with said user's cryptocurrency wallet.

15. The system of claim 11 wherein cryptocurrency recipient identity is determined to be known to cryptocurrency smart contract if there were successful transfers of said cryptocurrency to the said recipient in the past so that cryptocurrency balance of recipient public address is positive at the time of said determination.

16. The system of claim 11 wherein cryptocurrency recipient identity is determined to be known to cryptocurrency smart contract, using the call of the smart contract for cryptocurrency to oracle smart contract on the same Blockchain, utilizing off-chain identification-as-a-service.

17. The system of claim 15 wherein the first transfer of cryptocurrency from a pre-determined public account address is accomplished in conjunction with user onboarding.

18. The system of claim 13, wherein cryptocurrency transfers may be reversed, resulting in recipient balance decreased and sender balance equally increased.

19. The system of claim 14 wherein blockchain network nodes software queries identification-as-a-service for the timestamp of the pending blockchain transaction.

20. The system of claim 19 wherein blockchain nodes order transactions in blocks according to their timestamp, thus preventing attacks on blockchain integrity and improving consensus algorithms.

* * * * *